(12) United States Patent
Flothmann et al.

(10) Patent No.: US 11,167,622 B2
(45) Date of Patent: Nov. 9, 2021

(54) AIR VENT

(71) Applicant: fischer automotive systems GmbH & Co. KG, Horb a.N. (DE)

(72) Inventors: Jörg Flothmann, Bondorf (DE); Gunter Leopold, Baiersbronn (DE)

(73) Assignee: fischer automotive systems GmbH & Co. KG, Horb, a.N. (DE)

( * ) Notice: Subject to any disclaimer, the term of this patent is extended or adjusted under 35 U.S.C. 154(b) by 133 days.

(21) Appl. No.: 16/684,319

(22) Filed: Nov. 14, 2019

(65) Prior Publication Data

US 2020/0164721 A1  May 28, 2020

(30) Foreign Application Priority Data

Nov. 28, 2018 (DE) ...................... 10 2018 130 048.4

(51) Int. Cl.
*B60H 1/34* (2006.01)
(52) U.S. Cl.
CPC ................... *B60H 1/345* (2013.01)
(58) Field of Classification Search
CPC .......... B60H 1/345; B60H 2001/3471; B60H 1/3421; B60H 1/3414; B60H 1/34; B60H 2001/3478
See application file for complete search history.

(56) References Cited

U.S. PATENT DOCUMENTS

| | | | |
|---|---|---|---|
| 2016/0101668 A1* | 4/2016 | Doll | F24F 13/072 454/155 |
| 2016/0288624 A1 | 10/2016 | Albin | |
| 2017/0120721 A1 | 5/2017 | Zhang | |
| 2019/0270363 A1 | 9/2019 | Hoerschler | |

FOREIGN PATENT DOCUMENTS

| | | |
|---|---|---|
| DE | 10 2016 105 861 A1 | 10/2016 |
| DE | 20 2016 105 996 U1 | 1/2017 |
| DE | 10 2017 111 011 A1 | 7/2017 |
| DE | 10 2016 116 356 A1 | 3/2018 |
| DE | 10 2016 225 128 A1 | 6/2018 |
| DE | 10 2017 106 275 A1 | 9/2018 |

OTHER PUBLICATIONS

Search Report for corresponding German Application No. 10 2018 130 049.2, dated Jul. 23, 2019.

* cited by examiner

*Primary Examiner* — Jessica Yuen
(74) *Attorney, Agent, or Firm* — Renner, Otto, Boisselle & Sklar, LLP

(57) ABSTRACT

An air vent for ventilating a passenger compartment of a motor vehicle, which is divided into two air channels, wherein pivotable rudders for air guidance are disposed in each air channel. The rudders are provided with pinion segments and pivoted by way of toothed racks, which are integral with one another by way of a web.

10 Claims, 2 Drawing Sheets

AIR VENT

CROSS-REFERENCE TO RELATED APPLICATION

This application claims priority under 35 USC § 119 to German Patent Application No. 10 2018 130 048.4, filed on Nov. 28, 2018, the entire disclosure of which is incorporated herein by reference.

TECHNICAL FIELD OF THE INVENTION

The invention relates to an air vent.

DISCUSSION OF THE RELATED ART

Air vents are used to ventilate, heat and, if necessary, cool a passenger compartment of a motor vehicle. These are typically disposed in a recessed manner, for example on sides to the left and right and/or in the center of an instrument panel, in a center console or in another location of a motor vehicle, so that an air outlet opening of the air vent opens flush with a surface of the center console of the instrument panel or the like into a passenger compartment of the motor vehicle.

So as to guide an air current, known air vents comprise planar, plate-shaped deflecting elements, which are disposed parallel to one another and at a distance next to one another, or on top of one another, and can be pivoted about mutually parallel pivot axes, and which are referred to as rudders here, based on rudders and elevators used in control surface mechanisms of airplanes.

Coupling rods, which engage on the rudders in an articulated manner, at a distance from the pivot axes, so that the rudders jointly pivot parallel to one another by way of displacement of the coupling rod, are known for joint parallel pivoting of the rudders.

Utility model DE 20 2016 105 996 U1 discloses a toothed rack meshing with pinions that are rigidly connected to rudders disposed next to one another in an air vent and that are coaxial with pivot axes of the rudders. Displacement of the rack jointly pivots the pinions and the rudders rigidly connected thereto in a parallel manner.

Unexamined patent application DE 10 2016 116 356 A1 discloses an air vent including an air channel, which splits into two air channels located on top of one another, which initially diverge in an arc-shaped manner, and thereafter obliquely converge to form outlet openings of the air channels, which can also be interpreted as air outlet openings of the air vent. The ratio of air volumes flowing through the two air channels influences the outflow direction of a shared exit air current, which is formed by the air currents that flow through the two air channels merging after exiting the outlet openings. If the air volume in one air channel is greater, the shared exit air current exits obliquely in the direction of the other air channel.

So as to guide the air currents flowing through the two air channels in a lateral direction, rudders are disposed at a distance next to one another and parallel to one another in the two air channels of the known air vent. Two rudders, which are respectively disposed coaxially in the two air channels, are rigidly attached to a pivot shaft, so that the two rudders are identically oriented and jointly pivoted.

SUMMARY OF THE INVENTION

It is the object of the invention to provide a pivoting mechanism or, in general, a device for jointly pivoting rudders, which are disposed in two air channels of an air vent having two air channels. An air vent having more than two air channels is also possible, wherein rudders that can be jointly pivoted by way of the pivoting mechanism or, in general, by the device, are disposed in at least two of the air channels.

The air vent according to the invention includes a first air channel and a second air channel, each having an outlet opening. The outlet openings can open separately into a passenger compartment of a motor vehicle, for example, and then together form an air outlet opening of the air vent. The two outlet openings can also merge directly at, and form, a shared air outlet opening of the air vent. Alternatively, the two air channels open with the outlet openings thereof into a shared duct section, which then forms the air outlet opening of the air vent, at a distance from the outlet openings.

Toward the two outlet openings, the two air channels converge obliquely toward one another, so that air currents flowing through the two air channels, which exit through the outlet openings, merge in the region of the air outlet opening to form a shared exit air current, the direction of which is dependent on the ratio of air volumes flowing through the two air channels. An additional, different air guidance is not precluded.

So as to guide the exit air current transversely to the direction in which the current is guided by the air volumes flowing through the two air channels that converge obliquely toward one another, toward the outlet openings, multiple rudders are disposed next to one another in the air channels of the air vent according to the invention. "Next to one another" refers to a direction transverse to the oblique progression of the air channels, toward the outlet openings. The rudders can be pivoted about pivot axes, wherein the pivot axes of the rudders in an air channel are preferably disposed parallel to one another and/or in a shared transverse plane of the air channel.

For joint pivoting, the rudders comprise pinion segments, which mesh with a toothed rack. A "pinion segment" shall be understood to mean a segment of a pinion, which is to say a pinion extending across a limited circumferential section. Within the meaning of the invention, a pinion segment shall also be understood to include a complete pinion. For the rudders of the two air channels, (at least) one toothed rack is provided in each case, which meshes with the pinion segments of the rudders in this air channel, so that the rudders jointly pivot in each of the two air channels. According to the invention, the toothed racks for the rudders are non-slidably connected to one another in the two air channels, so that the toothed racks are jointly displaced and thereby jointly pivot the rudders in the two air channels. The toothed racks are preferably rigidly connected to one another, for example, these are designed integrally with one another on a shared component.

One embodiment of the invention provides for the pinion segments to be coaxial with respect to the pivot axes of the rudders. This allows for simple production, for example, by pressing the pinion segments onto the pivot shafts of the rudders or producing these integrally with the rudders. However, pinion segments are also conceivable that are angularly offset and/or radially offset with respect to the pivot axes of the rudders and are connected to the rudders by, for example, an articulated drive connection so that the rudders are pivoted about the same or a different angle during pivoting of the pinion segments, as a result of displacement of the toothed racks.

The toothed racks, the rudders, and the pivot axes of the rudders and/or of the pinion segments can be disposed in a shared transverse plane of the air vent or be offset in a flow direction through the air channels. The flow direction is a longitudinal direction, and in particular a line through centers of cross-sections of the two air channels, which may be straight or may not be straight.

The toothed racks can be angularly offset about the longitudinal directions thereof with respect to one another, which means that the teeth of the toothed racks point in different angular directions transversely to the longitudinal directions thereof. The toothed racks are essentially "tilted" with respect to one another.

One embodiment of the invention provides for the rudders in one of the two air channels, which is referred to as the first air channel here, to be disposed closer to the air outlet opening of the air vent than the rudders are disposed in the other air channel, which is to say, in the second air channel here, to the air outlet opening of the air vent. In particular, the rudders in the air channel that is located at the top, in an intended installation and usage position of the air vent, is disposed closer to the air outlet opening than the rudders in the other air channel, which is located at the bottom, in the intended installation and usage position of the air vent. In the terminology used here, the upper air channel is the first air channel, and the lower air channel is the second air channel.

The closer the rudders are disposed to the air outlet opening, the better the guiding effect thereof will be on the exit air current flowing out of the air vent. The reason for disposing the rudders at differing distances from the air outlet opening of the air vent is so that these are not visible to passengers, and in particular to a driver and/or a front-seat passenger, to the extent possible. The rudders are to be disposed in the two air channels so as not to be visible through the air outlet opening when the driver and/or the front-seat passenger assume intended transportation positions in a passenger compartment of a motor vehicle, in particular when these are sitting on the front seats of a motor vehicle, and the heads thereof are present at an intended height in front of headrests. The arrangement of the rudders in the air channels of the air vent is also dependent on the arrangement of the air vent in the instrument panel, the center console or in another location of the motor vehicle.

The features and feature combinations, designs and embodiments of the invention mentioned above in the description, and the features and feature combinations mentioned hereafter in the description of the figures and/or shown in a figure, can be used not only in the respective indicated or shown combinations, but also in other essentially arbitrary combinations, or alone. Embodiments of the invention that do not include all the features of a dependent claim are possible. It is also possible to replace individual features of a claim with other disclosed features or feature combinations.

BRIEF DESCRIPTION OF THE DRAWINGS

The invention will be described hereafter in greater detail based on one exemplary embodiment shown schematically in a simplified form in the drawings. In the drawings.

DETAILED DESCRIPTION OF THE INVENTION

Figure 1:
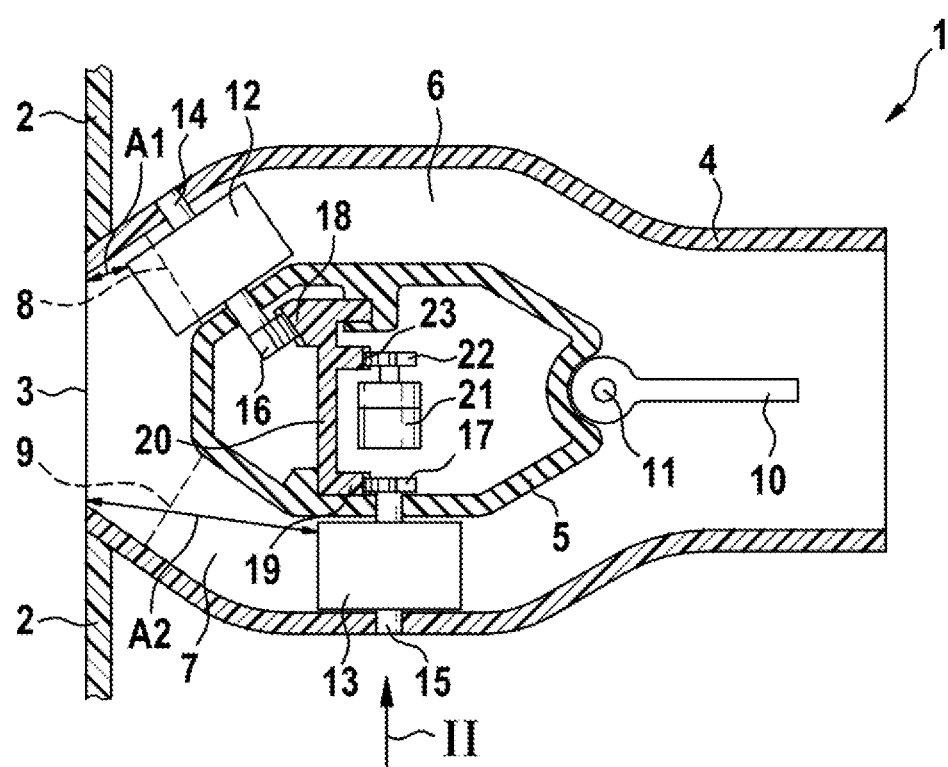
FIG. 1 shows a vertical longitudinal sectional view of an air vent according to the invention.

The air vent 1 according to the invention shown in the drawing is intended to be installed in an instrument panel 2, for example, of a motor vehicle, which is not shown in detail. FIG. 1 only shows a cut-away drawing of the instrument panel 2, which surrounds an air outlet opening 3 of the air vent 1. The air outlet opening 3 is flush with the instrument panel 2, and the air vent 1 is installed so as to be recessed in the instrument panel 2.

The air vent 1 comprises a rectangular tube-shaped housing 4, which is divided by a splitter 5 into two air channels 6, 7 on a portion of the length thereof, which for the distinction thereof are also referred to as a first air channel 6 and as a second air channel 7 here. In the exemplary embodiment, the splitter 5 is a hollow body having a consistent cross-section over the entire length thereof, which extends transversely through the housing 4. The cross-section of the splitter 5 extends in a longitudinal direction of the air vent 1, of the two air channels 6, 7, and of the housing 4. In the region of the splitter 5, the two air channels 6, 7 initially diverge obliquely, then extend parallel to one another for a distance, and thereafter obliquely converge toward one another again in the direction of the air outlet opening 3. At ends facing the air outlet opening 3 of the air vent 1, the two air channels 6, 7 end with outlet openings 8, 9, which in the exemplary embodiment are located inside the rectangular tube-shaped housing 4 of the air vent 1, which thus do not coincide with the air outlet opening 3 of the air vent 1. The rectangular tube-shaped housing 4 of the air vent 1 likewise forms an air channel, which is referred to as a housing 4 so as to be distinguished from the two air channels 6, 7 into which the splitter 5 divides the housing 4 on a portion of the length thereof. In FIG. 1, the positions of the outlet openings 8, 9 of the two air channels 6, 7 are illustrated with dotted lines, which do not indicate body edges, screens or other physical features.

A planar plate is disposed on a side of the splitter 5 facing away from the air outlet opening 3 to serve as a guide vane 10, which is pivotable about a pivot axis 11, which is horizontal in the exemplary embodiment. The guide vane 10 can be pivoted upward and downward or, expressed in general terms, transversely to the longitudinal direction of the housing 4, so as to selectively partially or completely block one of the two air channels 6, 7. Pivoting of the guide vane 10 allows a ratio of air volumes flowing through the two air channels 6, 7 to be set and modified. Since the two air channels 6, 7 converge obliquely toward one another, toward the outlet openings 8, 9 thereof, the ratio of the air volumes flowing through the two air channels 6, 7 influences a direction of a shared exit air current into which two air currents flowing through the two air channels 6, 7 merge after exiting through the outlet openings 8, 9. If the air volume through one of the two air channels 6, 7 is greater, the exit air current exits the air outlet opening 3 of the air vent 1 obliquely in the direction of the other air channel 7, 6. If, for example, an air current flowing through the first air channel 6, which in FIG. 1 is present at the top, is greater, the exit air current exits obliquely downwardly, and vice versa.

Rudders 12, 13 are disposed at a distance from and parallel and next to one another in the two air channels 6, 7. The rudders 12, 13 are planar, plate-shaped air-deflecting elements that are disposed so as to be pivotable about parallel pivot axes 14, 15. In each air channel 6, 7, the pivot axes 14, 15 are located in a transverse plane of the respective air channel 6, 7. The guide vane 10 on the side of the splitter 5 facing away from the air outlet opening 3 can likewise be interpreted as a rudder and is referred to here as a guide vane 10 so as to be distinguished from the rudders 12, 13 in the two air channels 6, 7. The rudders 12, 13 and the pivot axes 14, 15 thereof are disposed perpendicularly to the guide vane 10 and the pivot axis 11 thereof, so that the air currents flowing through the two air channels 6, 7 are guided by the rudders 12, 13 transversely to the direction in which the guide vane 10 guides the air current. In this way, it is possible to guide the exit air current out of the air outlet opening 3 of the air vent 1 to the left and right sides and to the top and the bottom.

Figure 2:
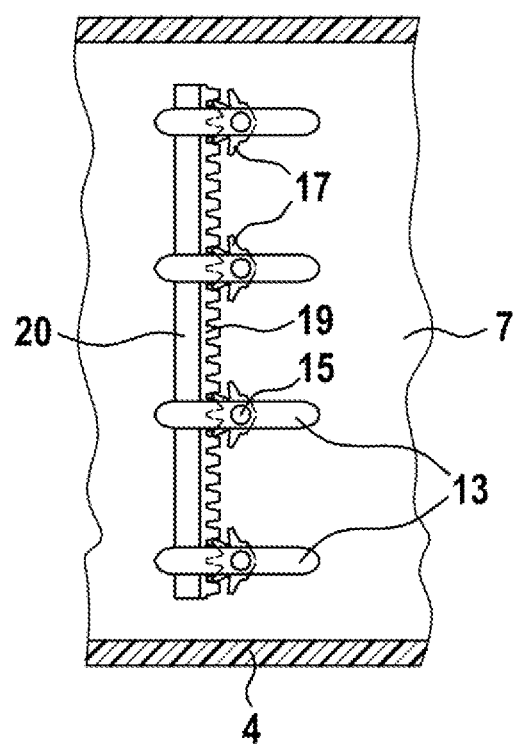
FIG. 2 shows a horizontal longitudinal sectional view of an air channel of the air vent from FIG. 1 in a region indicated by arrow II in FIG. 1.

Within the splitter 5 designed as a hollow body, pinion segments 16, 17 are rigidly disposed on pivot shafts of the rudders 12, 13. The pinion segments 16, 17 are pinions that only extend across a limited angle in the circumferential direction. The pivot shafts are rigidly connected to the rudders 12, 13 and define the pivot axes 14, 15 of the rudders 12, 13. FIG. 2 does not show a wall of the splitter 5, so that the pinion segments 17 of the rudders 13 of the second air channel 7 are visible. The pinion segments 16 of the rudders 12 of the first air channel 6 are not shown in FIG. 2. Instead of the pinion segments 16, 17, the rudders 12, 13 can also comprise pinions (not shown).

Toothed racks 18, 19, which are displaceably guided, inside the splitter 5 in the exemplary embodiment, transversely to the housing 4 and to the two air channels 6, 7, mesh with the pinion segments 16, 17. The toothed racks 18, 19 are rigidly connected to one another, and in the exemplary embodiment the toothed racks 18, 19 are integrally connected to one another by a web 20. Displacement of the two toothed racks 18, 19, which, as described, are rigidly connected to one another, jointly pivots the pinion segments 16, 17. Using the pinion segments 16, 17, the rudders 12, 13 in the two air channels 6, 7 are also jointly pivoted, so that the rudders 12, 13 are always parallel to one another in the two air channels 6, 7 and are jointly pivoted in a parallel manner.

So as to displace the toothed racks 18, 19, and thus so as to pivot the rudders 12, 13, a gear motor 21 is disposed in the splitter 5, which comprises a pinion 22 meshing with a third toothed rack 23, which is integrally, and thus likewise rigidly, connected to the web 20 and the two toothed racks 18, 19 with which the pinion segments 16, 17 of the rudders 12, 13 mesh. Other options for displacing the toothed racks 18, 19 are possible.

While the rudders 13 and the pivot axes 15 or pivot shafts thereof in the second air channel 7 are present in the section that is parallel to the first air channel 6, the rudders 12 and the pivot axes 14 or pivot shafts thereof in the first air channel 6 are present in the section extending obliquely toward the air outlet opening 8. In this way, the pivot axes 14 and the pivot shafts of the rudders 12, the rudders 12, and the pinion segments 16 are angularly offset in the first air channel 6, and are offset in a flow direction through the air channels 6, 7 with respect to the pivot axes 15 and the pivot shafts of the rudders 13, the rudders 13, and the pinion segments 17 in the second air channel 7. Corresponding to the offset of the pinion segments 16, 17, the toothed racks 18, 19 meshing therewith are also angularly offset, and are offset in the flow direction, which is to say the longitudinal direction of the air channels 6, 7 and the longitudinal direction of the housing 4 of the air vent 1.

Moreover, the rudders 12 in the first air channel 6 are disposed closer to the outlet opening 8 thereof than the rudders 13 in the second air channel 7 are disposed on the outlet opening 9 thereof. As a result, the distance A1 between the rudders 12 in the first air channel 6 and the air outlet opening 3 is also smaller than the distance A2 of the rudders 13 in the second air channel 7.

One embodiment of the invention provides for installation of the air vent 1 in the position shown in FIG. 1 with a horizontal splitter 5, a horizontal guide vane 10, and vertical rudders 12, 13. The first air channel 6 is thus located at the top, and the second air channel 7 is located at the bottom. The rudders 12, 13 are disposed so far away from the air outlet opening 3 of the air vent 1, offset into the two air channels 6, 7, that these are not visible through the air outlet opening 3 from obliquely above, where a head of a driver or a front-seat passenger is normally located when the driver or the front-seat passenger is sitting, as intended, on a front seat of a motor vehicle.

The invention claimed is:

1. An air vent, comprising a first air channel and a second air channel, both including an outlet opening, the two air channels converging obliquely toward one another, toward the outlet openings, so that air currents from the two outlet openings obliquely flow together and merge in the region of an air outlet opening to form a joint exit air current, a plurality of rudders being disposed next to one another in the two air channels, the rudders being pivotable about pivot axes so that the air currents flowing through the two air channels can be guided obliquely to the side by pivoting of the rudders, wherein the rudders comprise pinion segments, the air vent for the rudders of each of the two air channels comprises a toothed rack, the toothed rack for the rudders being non-slidably connected to one another in the two air channels, and the pinion segments of the rudders mesh with the toothed racks, so that the rudders in the two air channels are jointly pivoted by a displacement of the toothed racks.

2. The air vent according to claim 1, wherein the toothed racks are rigidly connected to one another.

3. The air vent according to claim 1, wherein the pinion segments are coaxial with respect to the pivot axes of the rudders.

4. The air vent according to claim 1, wherein the toothed racks and/or the rudders are offset from one another in a flow direction through the air channels.

5. The air vent according to claim 1, wherein the toothed racks are angularly offset about the longitudinal directions thereof with respect to one another.

6. The air vent according to claim 1, wherein the rudders in the first air channel are closer to the air outlet opening than the rudders in the second air channel.

7. The air vent according to claim 1, wherein the first air channel is located above the second air channel, in an intended installation and usage position of the air vent.

8. The air vent according to claim 1, wherein, in an intended installation and usage position of the air vent, the rudders are disposed in the two air channels so as not to be visible through the air outlet opening for a driver and a front-seat passenger who assume an intended transportation position in a passenger compartment of a motor vehicle.

9. The air vent according to claim 1 further comprising a housing in which the two air channels are arranged, wherein the air currents flowing through the two air channels merge inside the housing to form the joint exit air current in the housing prior to the joint exit air current exiting the housing.

10. The air vent according to claim 1, wherein each of the rudders of each of the two air channels are positioned in a respective one of the two air channels at a location that is downstream a diverging region of the two air channels.

* * * * *